Figure 1:
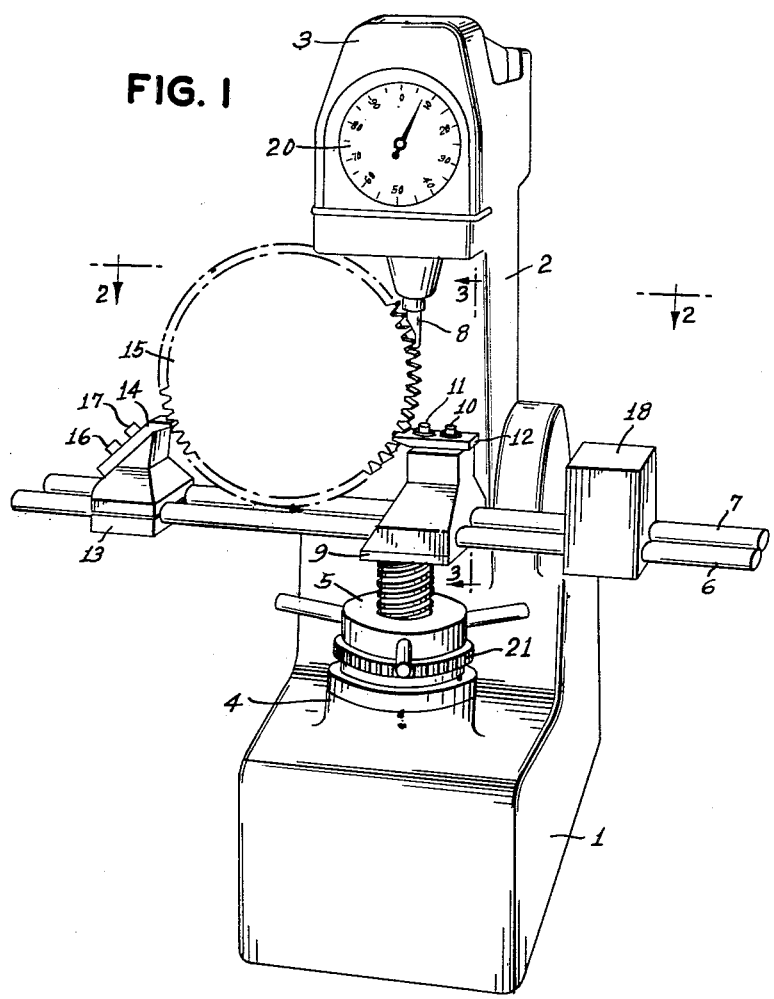

July 12, 1955

K. V. HOLM 2,712,754

PITCH LINE GEAR POSITIONER FIXTURE

Filed Aug. 19, 1952

2 Sheets-Sheet 1

INVENTOR.
Karl V. Holm
BY Pennie, Edmonds, Morton,
Barrows & Taylor
ATTORNEYS

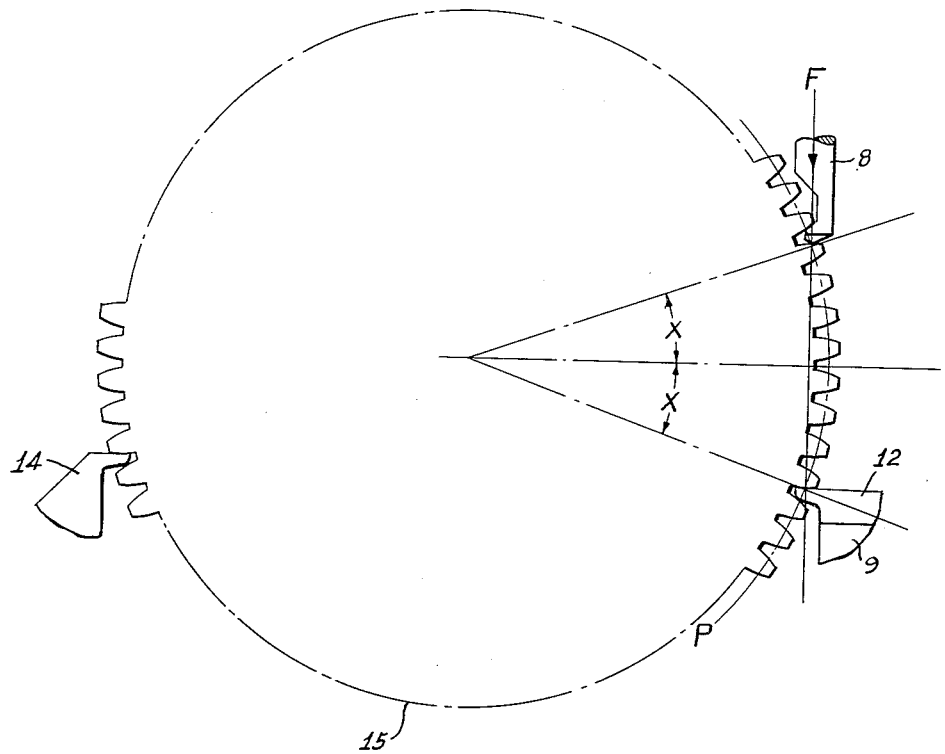

United States Patent Office 2,712,754
Patented July 12, 1955

2,712,754

PITCH LINE GEAR POSITIONER FIXTURE

Karl V. Holm, Detroit, Mich., assignor to Vinco Corporation, Detroit, Mich., a corporation of Michigan Application August 19, 1952, Serial No. 305,212

3 Claims. (Cl. 73—81)

This invention relates to an improvement in hardness testing machines and more particularly to hardness testing machines that are adaptable for use in testing the hardness of work pieces having geometrically complex shapes with interior critical surfaces such as gears and splines.

The technique of testing the hardness of articles is well known to the art and machines for that purpose are disclosed in U. S. Patents No. 1,516,207 and No. 1,516,208 to Rockwell and No. 1,762,497 to Wilson. This is the Rockwell hardness tester which is well known to the art. The Rockwell hardness tester operates by forcing a cylindrical penetrator with a conical end having a hardened steel ball or diamond point into the surface of the test material by making use of a predetermined and constant force. The index hardness is calculated from the amount of penetration obtained in the test material. The testers heretofore known to the art were satisfactory for use on regularly shaped bodies. Wilson, in Patent No. 1,890,923, added to the art a test piece holding support which enabled hardness testers to be used on flat irregular shaped bodies. However, nothing existed in the art which was satisfactory to test the hardness of interior critical surfaces of geometrically complex shapes as for example, the involute surface of a gear tooth or the driving face of a spline.

The difficulties inherent in the development of such a hardness tester lay in the problem of holding a generally circular, yet irregularly shaped body absolutely rigid and immovable throughout the entire testing operation so an accurate reading could be obtained. In the testing of gear surfaces, the problem was made particularly difficult because of the turning moment that is created in the gear when the force was applied through the penetrator to the surface of the gear teeth. Any movement in the test pieces would give an erroneous reading as there would be indicated a falsely large amount of penetration due to the test piece movement when the test force is applied. In addition most of the surfaces of irregularly shaped work pieces were inaccessible for hardness testing machines making use of standard testing equipment.

The present invention is directed to a hardness tester that is particularly adapted to testing the hardness of the surfaces of geometrically complex shapes such as gears and splines, by making use of a particularly shaped penetrator and an adjustable auxiliary work support for use with the Rockwell type of hardness tester.

My hardness tester comprises a hardness tester frame made up of the usual base, pillar, head and a principal work support which is adjustable vertically. On the principal work support is affixed an auxiliary work support comprising a horizontal support bed on which is clamped a fixed support directly over the principal work support. The fixed support is shaped to engage the teeth of the gear or other object which is to be tested and is positioned directly under the penetrator chuck. The penetrator tool used in the chuck has a large indentation in one side of it in order that its shaft will clear some gear teeth while its point enters between adjacent teeth. A vertically adjustable supporting foot is slidably mounted on one end of the horizontal support bed and a counterweight is slidably mounted on the other end of the support bed to balance the weight of the work piece.

Figure 3:
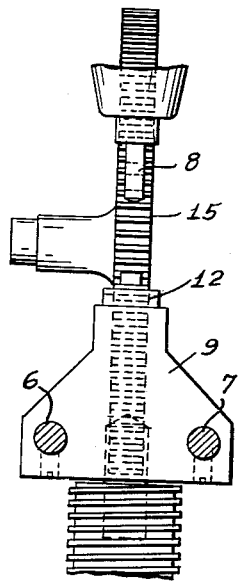
Figure 2:
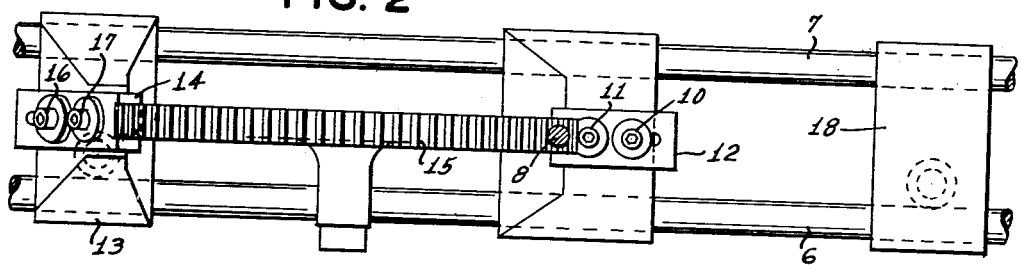

An advantageous embodiment of the present invention is described below and is shown in the accompanying drawings, in which:

Fig. 1 is a perspective view of the hardness tester;
Fig. 2 is a partial plan view taken on the line 2—2 of Fig. 1;
Fig. 3 is a partial side elevation taken on the line 3—3 of Fig. 1; and
Fig. 4 is a partial front elevation on a larger scale showing the relationship of the work piece under test to the work support.

Referring now to the accompanying drawings in which like characters of reference indicate the same parts in different views, the hardness tester comprises a base 1, pillar 2, and head 3 which are similar to those in the Rockwell tester. Supported on the base is a principal work support 4 comprising an elevating screw unit which is operated by a capstan nut 5. The auxiliary work support affixed to the top of the principal work support 4 comprises a horizontal support bed made up of two steel bars 6 and 7. Positioned directly over the principal work support and directly under the penetrator 8 is a fixed support 9. The fixed support has an engaging member 12 which is adjustable horizontally by loosening the bolts 10 and 11 so that the engaging member 12 can be moved back and forth horizontally. On the one end of the horizontal support bed is an adjustable supporting foot 13. The supporting foot 13 has an engaging member 14 shaped to engage the teeth of the work piece 15. The supporting foot 13 is slidably mounted on the bars 6 and 7 of the horizontal support bed. The engaging member 14 can be adjusted vertically by loosening bolts 16 and 17. At the other end of the horizontal support bed is a counterweight 18 which is slidably mounted on bars 6 and 7 of the support bed. A penetrator 8 is incorporated within the actuating mechanism in the head 3. The actuating force can be produced mechanically, hydraulically, or by any other suitable means. The penetrator 8 has an indentation on one side making it adaptable for engagement with the upper involute surface of the gear tooth being tested for hardness.

In carrying out the operation of the present invention the tester must be placed in adjustment for operation on a particular size gear. The adjustment has to be such that when the force is applied through the penetrator 8 to the involute surface of the gear tooth being tested a plane through the point of contact tangent to the surface being tested must be normal to the line of force F. Also, the point at which the force is applied must be directly over the fixed support in order that there will be no turning moment in the work piece when the major load is applied.

Fig. 4 shows the method of making this adjustment. I have devised a simple formula to determine the number of teeth between the fixed support 9 and the penetrator 8. X is the pressure angle; then 2X is the portion of the circumference that should be made use of in testing. It will be seen, then, that the number of teeth between the fixed support 9 and the penetrator 8 bears the same ratio to the total number of teeth of the gear as twice the pressure angle X bears to the full gear circle (360°). This relationship may be expressed mathematically by the formula:

$$n = \frac{2XN}{360°}$$

where n is the number of teeth to be used between the fixed support and the penetrator, N is the total number of teeth of the gear, and X is the pressure angle of the gear. Assuming X to be equal to 20°, the portion of the circumference between the penetrator 8 and fixed support 9 is 40°. 360° divided by 40° is 9 or restated ⅑ of the circumference is to be used or ten teeth where, for example, a 90 tooth gear is being tested. If, in applying my formula, the number of teeth does not come out even, my practice has been to use the nearest even number and adjust the adjustable supporting foot 13 and the engaging member 14 until the highest part of the involute surface is directly under and normal to the penetrator 8 and force line F. This is usually at or near the pitch diameter (P) of the gear. I make use of a height gauge to determine the highest point or the surface of the gear tooth which is at or near the pitch diameter (P). Then the counterweight 18 is adjusted to balance the weight of the work piece 15 so that the whole system is in a state of static equilibrium. When the system is so adjusted it does not have to be readjusted until a different size gear is to be tested and any or all teeth of the gear can be tested by sliding the gear out of the engaging members 14 and 12 and rotating it and sliding it back on the said engaging members.

In carrying out this invention, the work piece 15, assuming the hardness tester is in proper adjustment for the size of work being tested, is inserted in the auxiliary work support as shown in Fig. 1. The capstan nut 5 is adjusted upwardly bringing the work piece 15 in contact with the penetrator 8. The upward adjustment is continued until the dial gauge 20 indicates a reading. The knurled ring 21 under the capstan nut 5 is then adjusted to bring the dial gauge to zero. Minor load has then been applied. The work is then set for application of the major load along the force line F. The major load is applied directly down the force line F. Thus all the force is borne by the fixed support 9 so there is no turning moment in the work piece 15. The only force borne by the supporting foot 13 is the weight of the work piece normally supported by it. The amount of penetration is then read off the dial gauge 20 from which the index of hardness is computed.

I claim:

1. In the combination of a hardness tester for testing the hardness of work pieces having geometrically complex shapes, said hardness tester including a base, pillar, head, a penetrator chuck in said head movable toward said base, and a vertically adjustable principal work support on said base directly in line under said chuck, the improvement which comprises a horizontal support bed affixed to the top of said principal work support, a fixed support positioned on said bed directly under said chuck, said fixed support having a horizontally adjustable tooth engaging anvil the upper surface of which is normal to the line between the penetrator chuck and the principal work support, a horizontally adjustable supporting foot positioned towards one end of said bed in relation to said fixed support, said supporting foot having a vertically adjustable tooth engaging lug, a slidably mounted counterweight positioned towards the other end of said fixed support, and a penetrator tool in said chuck having an indentation in one side thereof whereby said tool may be used in testing the hardness of the interior surfaces of work pieces having geometrically complex shapes.

2. In a hardness tester adapted for use in testing the hardness of the interior surfaces of a generally round work piece having a plurality of uniform teeth of geometrically complex shape uniformly spaced about the circumference of the work piece, a horizontal support bed, means on the underside of said bed for attaching it to the principal work support of a hardness tester, a fixed support position on said bed directly over said attaching means, said fixed support having a horizontally adjustable tooth engaging anvil the upper surface of which is normal to the vertical axis of said attaching means, a horizontally adjustable supporting foot positioned towards one end of said bed in relation to said fixed support, said supporting foot having a vertically adjustable tooth engaging lug, a slidably mounted counterweight positioned towards the other end of said bed in relation to said fixed support, a penetrator tool comprising a substantially cylindrical shaft having a conical end, and a hard point of precise predetermined radius on said end, said tool being formed with a large indentation in one side of said shaft whereby said penetrator is peculiarly adapted for use in testing the interior surfaces of the irregularly shaped work pieces.

3. An auxiliary work support for hardness testers adapted for use in testing the hardness of work pieces having geometrically complex shapes which includes, in combination: a horizontal support bed adapted to be attached to the principal work support of a hardness tester, a fixed support positioned on said bed and adapted to lie directly over said principal work support of the hardness tester when said horizontal support bed is attached thereto, said fixed support having a horizontally adjustable tooth engaging anvil the upper surface of which lies in a plane parallel to the plane of the said horizontal support bed, a horizontally adjustable supporting foot positioned towards one end of said bed in relation to said fixed support, said supporting foot having a vertically adjustable tooth engaging lug, and a slidably mounted counterweight positioned towards the other end of said bed in relation to said fixed support.

References Cited in the file of this patent

UNITED STATES PATENTS

| | | |
|---|---|---|
| 1,890,923 | Wilson | Dec. 13, 1932 |
| 2,329,827 | Clark | Sept. 21, 1943 |
| 2,333,640 | Clark | Nov. 9, 1943 |

FOREIGN PATENTS

| | | |
|---|---|---|
| 673,759 | France | Oct. 14, 1929 |